United States Patent [19]

Weelink

[11] Patent Number: 5,054,430
[45] Date of Patent: Oct. 8, 1991

[54] DEVICE FOR FEEDING ANIMALS

[76] Inventor: Johannes M. W. Weelink, No. 58, Tynaarlosestraat, 9481 Ad Vries, Netherlands

[21] Appl. No.: 520,063

[22] Filed: May 3, 1990

[30] Foreign Application Priority Data

May 8, 1989 [NL] Netherlands .......................... 8901158

[51] Int. Cl.$^5$ ............................................... A01K 1/10
[52] U.S. Cl. ..................................... 119/60; 119/51.01
[58] Field of Search .................................. 119/60, 51.01

[56] References Cited

U.S. PATENT DOCUMENTS

| 3,620,192 | 11/1971 | Taylor | 119/60 |
| 3,738,327 | 6/1973 | Stirling | 119/51.01 |
| 4,009,687 | 3/1977 | Korthals | 119/60 |
| 4,148,278 | 4/1979 | Anderson | 119/60 |
| 4,419,963 | 12/1983 | Willibrodus | 119/51.01 |

FOREIGN PATENT DOCUMENTS

| 0061817 | 10/1982 | European Pat. Off. . | |
| 3712908 | 10/1987 | Fed. Rep. of Germany | 119/60 |
| 1054211 | 1/1967 | United Kingdom . | |

Primary Examiner—John G. Weiss
Attorney, Agent, or Firm—Wegner, Cantor, Mueller & Player

[57] ABSTRACT

Device for feeding animals comprising at least one feeding fence with a frame displaceable over a ground surface, a number of bars attached to the frame which in pairs define openings through which the animals can place their head, and means for displacing the feeding fence over the ground surface. The frame supports through support means directly on the ground surface and is provided with a floor plate extending at a small interval above the ground rearward of the frame to a rear edge making contact with the ground, which plate can support at least the front legs of the animals which have pushed their head through the respective openings, wherein the feeding fence is of the self-catching type having close to each opening a swivel bar locking behind the head of the animal after the head has been pushed through the opening, and wherein the displacing means comprise motor drive means which prevent movement of the feeding fence in the non-active state.

16 Claims, 7 Drawing Sheets

FIG.8

DEVICE FOR FEEDING ANIMALS

BACKGROUND OF THE INVENTION

The invention relates to a device for feeding animals comprising at least one feeding fence with a frame displaceable over a ground surface, a number of bars attached to the frame which define in pairs openings through which the animals can place their head, and means for displacing the feeding fence over the ground surface.

Such a device is known from GB-A-1 054 211. With this known device two feeding fences displaceable over the ground surface are disposed opposite one another. A quantity of fodder is heaped in the space between these two fences and via the openings in the feeding fences the animals can take up feed from the side of the heap of fodder. The fences are pushed stepwise towards one another whereby fresh fodder becomes accessible at each step. Arranged on the mutually facing sides of the feeding fences are extra spacer fences which rest against the fodder heap and define a distance such that the animals cannot reach too great a quantity of fodder, which they would waste. The displacing means in the known device are formed by rails arranged in the ground surface and slide pieces co-acting therewith on the frames of the feeding fences.

The known device has the drawback that it is relatively complex in construction and the displacing means have to take a heavy form in view of the forces applied to the feeding fence by the animals. Moreover, the daily movement of the feeding fences is troublesome because of the heavy weight, all the more so as the rail and slide piece construction rapidly become dirtied by fodder remnants, thus making a smooth movement difficult.

SUMMARY OF THE INVENTION

The invention has for its object to provide a device of the type specified in the preamble which does not have these drawbacks.

With the device according to the invention this is achieved in that the frame supports directly on the ground surface through support means and is provided with a floor plate extending at a small interval above the ground rearward of the frame to a rear edge making contact with the ground, which plate can support at least the front legs of the animals which have pushed their head through the respective openings, wherein the feeding fence is of the self-catching type having close to each opening a swivel bar locking behind the head of the animal after the head has been pushed through the opening, and wherein the displacing means comprise motor drive means which prevent movement of the feeding fence in the non-active state. On the one hand because of the floor plate and on the other because the feeding fence supports directly on the ground surface and not by means of rails and slide pieces, a simple and comparatively light construction is obtained. Through the motor drive means the feeding fence can be displaced simply without any exertion of force so that an economic use of the device aimed at a maximum take up of the bulk feed by the animals can be achieved. By using feeding fences of the self-catching type there are furthermore no extra spacing fences necessary as in the state of the art to prevent wastage of the feed. This contributes to the simple and light construction of the device according to the invention, while a good take up of fodder is ensured.

It has been found in practice that with the device according to the invention, when the feeding fence is moved twice daily, a bulk feed take up of the animals can be achieved that is 20% higher than in the usual devices with fixedly disposed feeding fence.

The support means preferably comprise a number of wheels mounted rotatably on the frame. The feeding fence can hereby be moved very lightly over the ground surface.

When the step of claim 3 is thereby applied the feeding fence will displace reciprocally parallel to itself in a certain manner so that for a very long period the feeding fence remains in the correct position on the ground surface.

A simple embodiment of the device according to the invention is characterized in claim 4. Hereby the actual feeding fence itself no longer contains any moving parts. The separate drive device engages externally onto the actual feeding fence in simple manner.

A particularly effective embodiment is further characterized in claim 5. The respective drive devices of the feeding fences disposed opposite one another can hereby be at least partially combined so that an economic construction can be achieved.

With the step of claim 6 the desired reciprocating movement can be obtained in very simple manner.

The drive device can be embodied in many different ways. A favourable embodiment is characterized in claim 7. A screw driving is operationally reliable and comparatively insensitive to dirtying so that a long, reliable operation is ensured. When this drive device is used with two feeding fences disposed opposite one another the step of claim 8 is preferably applied.

By making use of the step of claim 9 the screwed spindles can still be arranged in favourable manner at a level located considerably above the ground, without decreasing the accessibility of the space between the feeding fences. At a height above the ground the dirtying of the screwed spindles is in a favourable manner considerably less.

Further favourable embodiments are to be found in the remaining sub-claims.

BRIEF DESCRIPTION OF THE DRAWINGS

The invention will be further elucidated in the following description with reference to the embodiments shown in the figures.

DETAILED DESCRIPTION OF THE INVENTION

Figure 1:
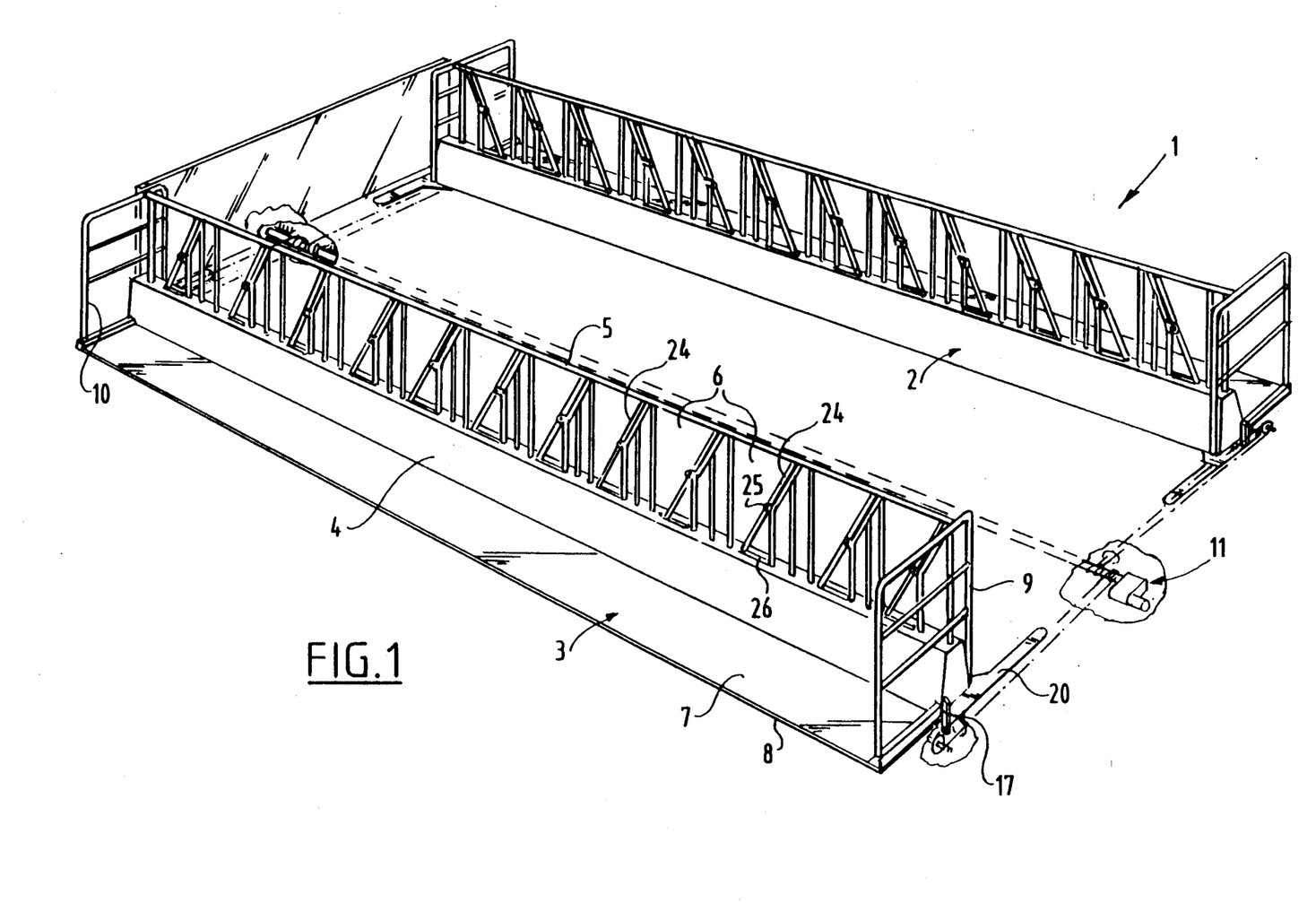
FIG. 1 shows in perspective view two feeding fences according to the invention disposed opposite one another.

The feeding fence device 1 of FIG. 1 comprises two feeding fences 2 and 3 disposed opposite one another. Each of these feeding fence 2, 3 comprises a frame 4 on which is placed a fence 5. The fence 5 comprises a number of bars between which are defined respective openings 6 through which animals can push their head in order to take up fodder placed in front of the fence.

The feeding fences are of the so-called self-catching type, wherein present close to each opening 6 is a bar 24 which can swivel by means of a hinge 25. In the opened position of the swivel bars 24 as shown in FIG. 1 animals, such as cows, can push their head through the opening 6 at the top. As the head moves downward, the neck of the animal comes against the portion of the swivel bar 24 lying below the hinge 25, whereby the swivel bar 24 is swivelled into a vertical position. The bottom end of the swivel bar 24 co-acts via a slot 26 in the frame 4 with locking means which lock the swivel bar 24 in the vertical position. Hereby the animal can no longer withdraw its head through the opening 6. In known manner control means (not shown) are further present wherewith the locks can be disengaged so that the swivel bars 24 are once again released and the animals can withdraw their head from the openings 6.

Because the animals are thus locked in the fence as soon as they wish to start feeding, these animals will continue to feed until their needs are satisfied. Wastage of fodder is hereby prevented to a considerable extent.

Extending rearward of the frame 4 is a floor plate 7, whereof the rear edge 8 rests on the ground. Arranged on either side of each feeding fence are side fences 9, 10.

Each feeding fence 2, 3 rests by means of slide pieces directly on the ground surface and can thus slide thereover. These slide pieces may be steel slide shoes or may be formed for example by nylon blocks.

Figure 2:
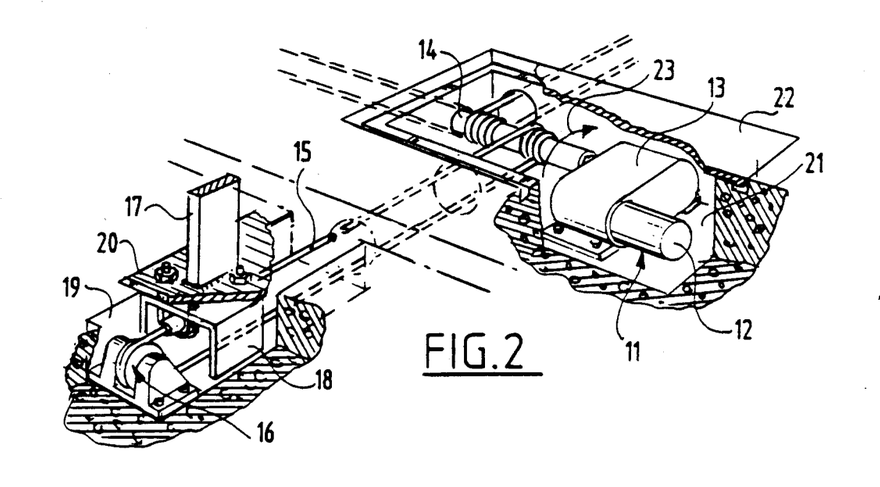
FIG. 2 shows in partly broken away view a detail of the drive device of the feeding fence of FIG. 1.

As noted, fodder that can be taken up by the animals is placed in front of the feeding fences 2, 3, that is, in the space between them as seen in FIG. 1. The animals can consume as much as is accessible to them. As soon as this accessible fodder is assimilated the feeding fences 2, 3 are moved towards one another by means of a drive device 11. This drive device 11 shown in more detail in FIG. 2 comprises a reversible electromotor 12 which drives rotatably a fixedly mounted rod 14 via reduction gearing 13. Wound around this rod 14 are cables 15 which are trained about cable pulleys 16 arranged fixedly adjacent to the respective feeding fences. The ends of each cable 15 are fastened to a support 17 connected fixedly to the relevant feeding fence. As shown in FIG. 2 the support 17 also bears a guide 18 which fits into a slot 19 formed in the ground.

As shown in FIG. 2 the upper part of the cable 15 is fastened to the support 17 of the feeding fence 3. When the rod 14 is rotated in the direction of the arrow 23 the upper part 15 is therefore pulled towards the rod 14 and the fence 3 displaced forwards. It will be apparent that the fence 2 is fastened in similar manner to the relevant cable, but to the lower part, so that when the rod 14 is rotated in the direction indicated the fences 2, 3 are pulled towards one another.

As FIG. 1 shows the rod 14 extends over the full length of the two feeding fences 2, 3 and a similar cable construction is arranged at the opposite end so that the feeding fences 2, 3 are driven at both ends, thus ensuring a stable operation.

Connected to each support 17 of the feeding fences 2, 3 is a cover plate 20 which covers the slot 19 formed in the ground in all positions of the relevant feeding fences between the wholly moved forward and moved back positions. Dirtying of the drive device by fodder remnants and manure is prevented in this manner. The drive gear 13 with motor 12 and associated components is mounted in a pit 21 arranged in the floor and closed off using a cover 22. In the embodiment of FIG. 1 described here, the rod 14 mounted at either end on a fixed point forms a support element relative to which the frame of the feeding fences can be driven in forward and rearward direction by the drive device 11.

When the feeding fences 2 and 3 are placed in the position moved closest toward one another and the fodder is entirely consumed, the motor 12 of the drive device 11 is switched on in reverse direction whereby the feeding fences are moved away from one another into their mutually most remote position. Fresh fodder can then be placed between the fences.

The feeding fence 75 shown in FIG. 3 comprises a frame 76 wherein in a manner to be described later a lengthwise shaft 77 is mounted. This lengthwise shaft bears a number of wheels 78 connected fixedly thereto which form the support means wherewith the frame 76 supports directly on the ground surface. The wheels have a diameter of more than 20 cm. In a preferred embodiment, said wheels have a diameter of 40 cm.

The lengthwise shaft 77 can be driven in a manner to be further described using a drive device 79. This comprises a reversible electromotor which is fed via an electric cable 80 fastened to the ceiling of the shed where the device according to the invention is in use.

In the same manner as with the above described embodiment the feeding fence 75 comprises a number of feeding openings 81 which are bounded on one side by a swivel bar 82, wherein an animal that pushes its head through the opening 81 in order to begin feeding is locked into the fence 75.

Figure 3:
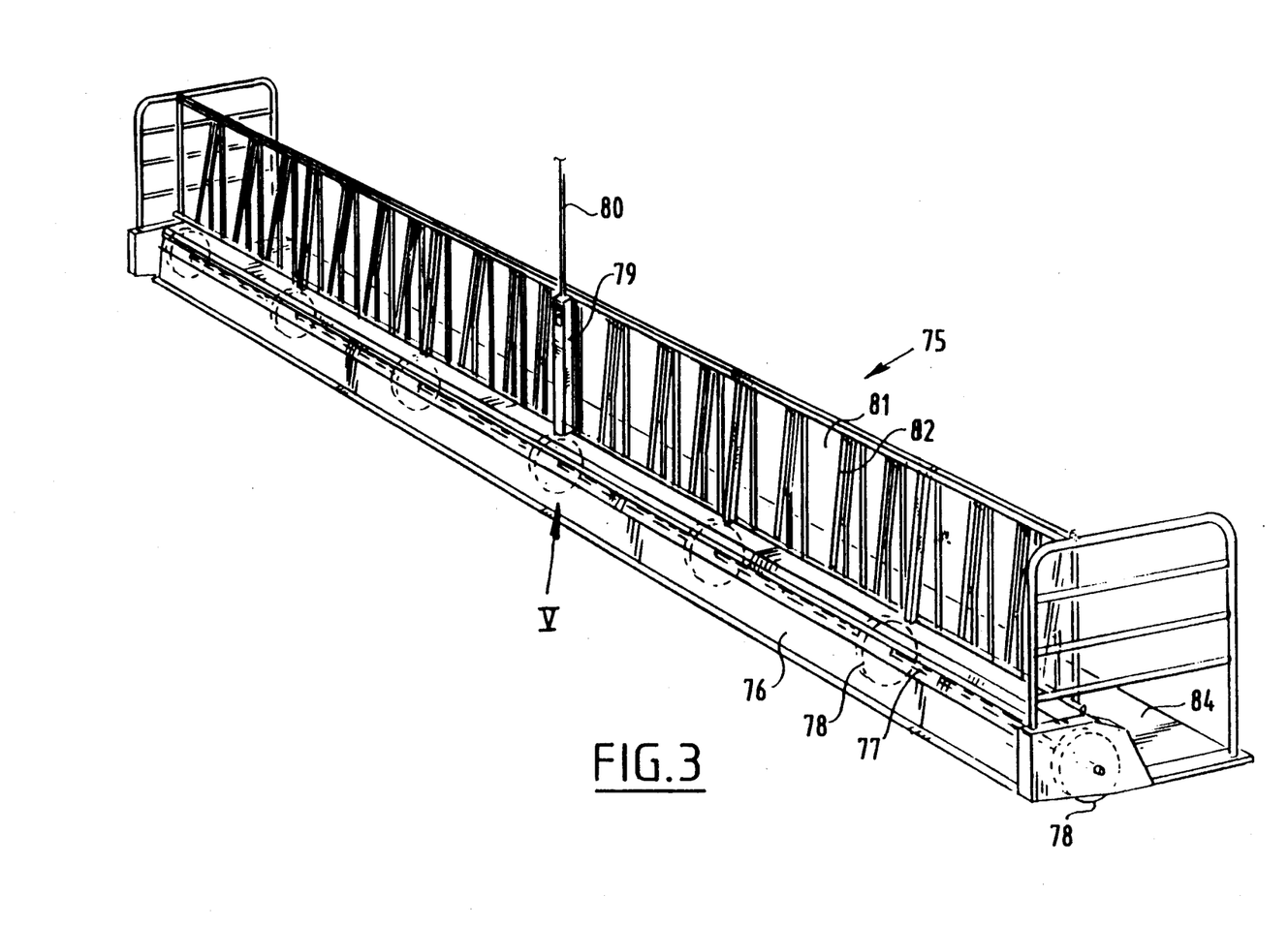
FIG. 3 shows a preferred embodiment of the device according to the invention.
Figure 4:
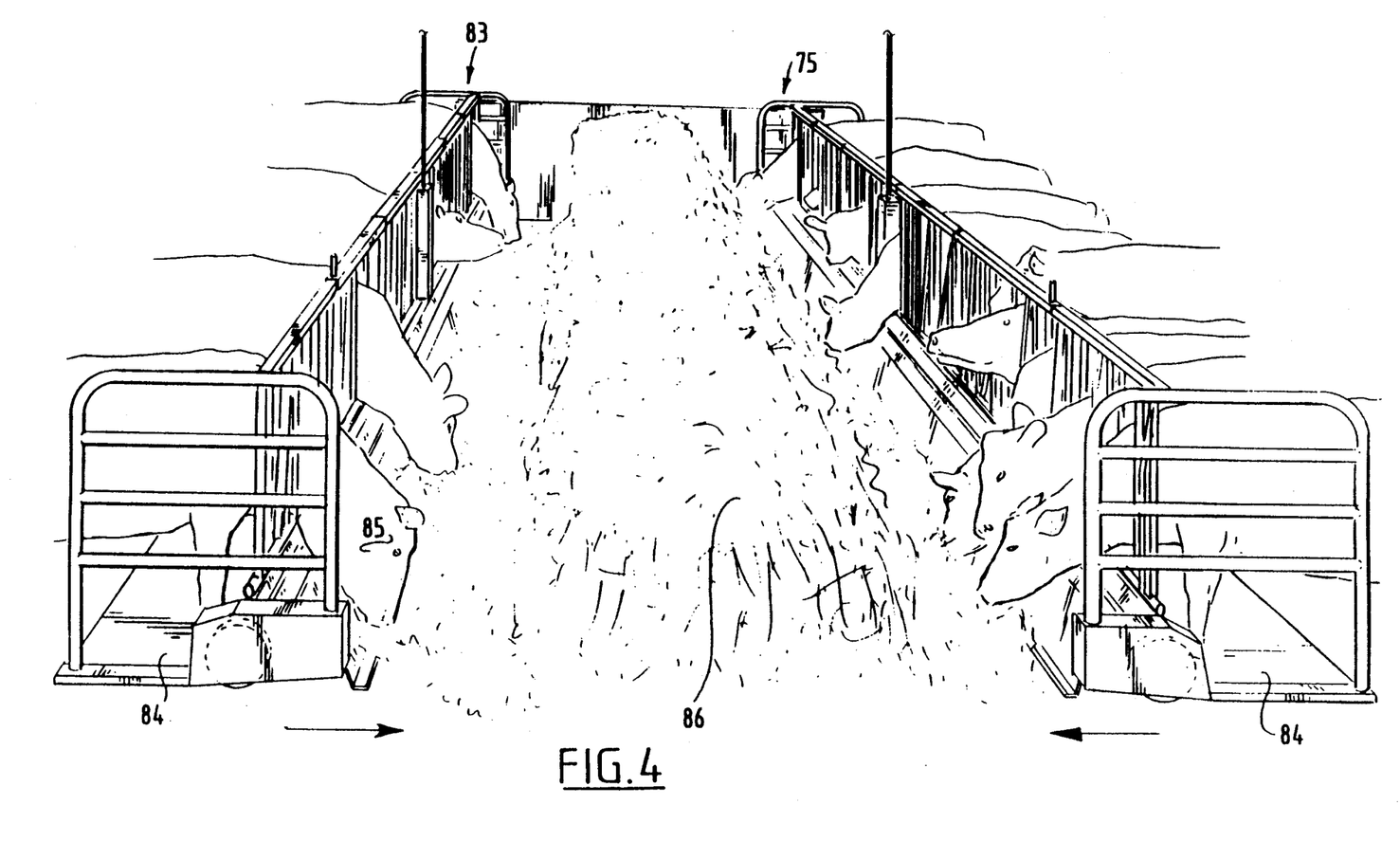
FIG. 4 shows a perspective view of two feeding fences disposed opposite one another as in FIG. 3, in operation.

FIG. 4 shows the feeding fence 75 of FIG. 3 in a device together with an identical feeding fence 83 disposed opposite. As shown, a quantity of fodder 86 is heaped between the feeding fences 75 and 83. During feeding the animals, in this case cows 85, push their head through the above mentioned openings 81 in order to be able to reach the heaped fodder 86. The cows 85 support therein with their front legs on the floor plate 84 which is fixedly connected to the frame of the relevant feeding fence. Any force applied to the fence by the pushing of the cows 85 is directly compensated by the reaction force exerted by the front legs so that a closed system of forces results and the feeding fences cannot be pushed over. Because of the short path of force the construction of the feeding fences can be comparatively light.

Figure 5:
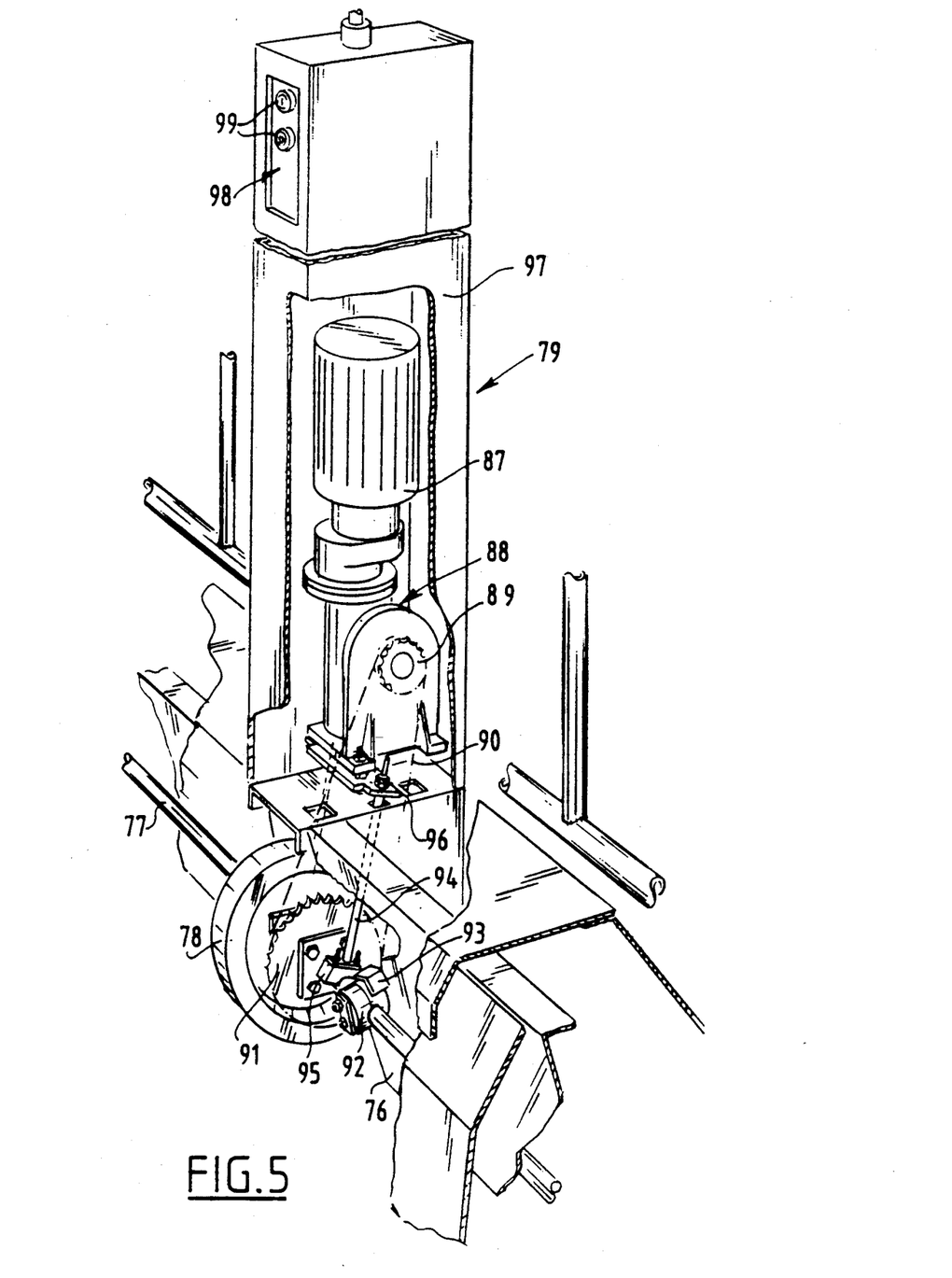
FIG. 5 shows a partly broken away detail view along arrow V in FIG. 3.

The drive device 79 of the feeding fences as shown in FIG. 3 and 4 is shown in more detail in FIG. 5. This drive device 79 comprises a reversible electromotor 87 mounted on a reduction gearing 88. Mounted on an output shaft of this reduction gearing 88 is a gear wheel 89 which via a chain 90 is in driving connection with a gear wheel 91 that is mounted fixedly on the lengthwise shaft 77. The lengthwise shaft 77 is connected rotatably to the frame 76 by means of bearing blocks 92 which consist of two mutually clamped plastic blocks, for instance of nylon, leaving free a bearing channel. Welded fixedly to the frame 76 is a V-shaped support plate 93 against which the bearing block 92 rests, thus being able to transmit the vertical forces.

Arranged close to the chain transmission and between the shaft 77 and the drive gear 88 is a reaction rod 94 which on one side supports by means of a nylon block 95 on the shaft 77 and on the other side supports against a plate 96 connected to the reduction gearing 88. The reaction rod directly takes up the chain forces so that these do not have to be transmitted via the frame 76, whereby it can remain light. Arranged around the drive gear 88 and the motor 87 is a casing 97. In the top part of the casing 97 is housed a switch unit 98 which is provided with push-buttons 99 with which the motor 87 can be actuated. In the switch unit 98 can be incorporated an adjustable switch timer which switches on the motor 87 for a determined duration of time after pressing of one of the pushbuttons 99. This switch-on period determines the distance over which the feeding fence is displaced. Depending on the length of the feeding fence, that is, the number of feeding openings therein, the height of the fodder heap 86 and the fodder requirement of the animals, the farmer can establish the desired movement distance each time by means of the switch-on duration.

Figure 6:
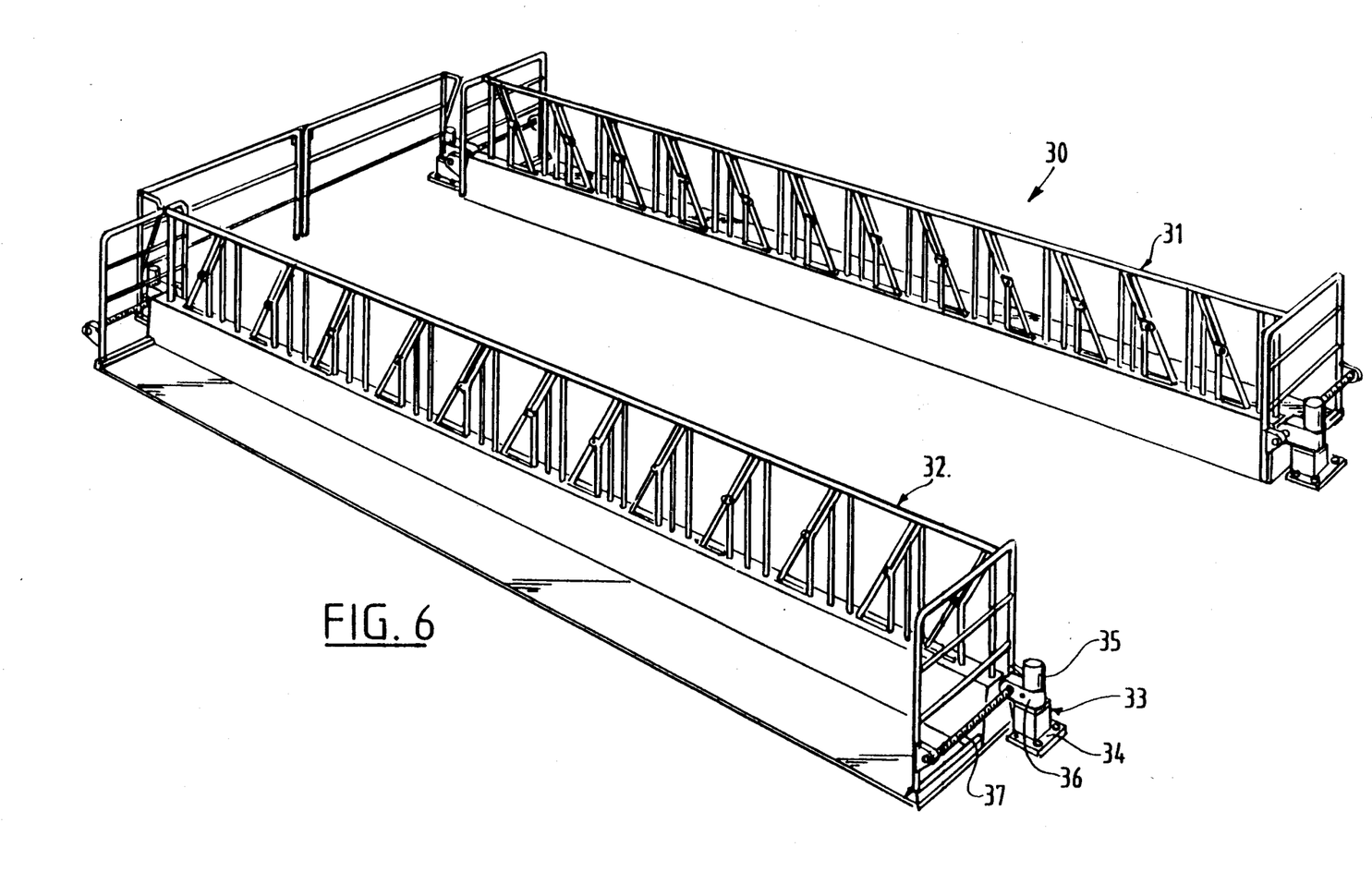
FIG. 6 shows in perspective view corresponding with FIG. 1 another embodiment of the feeding fence according to the invention.

The feeding fence device of FIG. 6 corresponds in large measure with that shown in FIG. 1. The device 30 likewise comprises two feeding fences 31 and 32 which can be moved towards and away from one another by drive devices close to each lengthwise end of each feeding fence 31, 32. Each drive device 33 here comprises a support 34 mounted fixedly to the ground and bearing a drive gear 36 driven by a reversible electromotor 35. At the end of each fence 31, 32 a screwed spindle 37 is mounted fixedly, that is, non-rotatably. The drive gear 36 comprises a rotatably mounted nut which engages on the screwed spindle 37 and which can be set into rotation via a reduction gearing by the motor 35. The motors 35 of the drive devices 33 of a fence 31 or 32 are in any case driven synchronously. In preference all four motors of all four drive gears are driven synchronously, wherein the rotation direction is of course such that when the drive devices are switched on simultaneously the feeding fences 31, 32 move towards or away from one another.

Instead of four separate drive gears with four separate motors as shown in FIG. 6, a screw drive device with one drive motor can also be employed. Such an embodiment is shown schematically in FIG. 7. The drive device 40 here comprises a transmission 41 connected fixedly to the ground which, in the manner already described with reference to FIG. 6, can in the first place move reciprocally via a motor 42 a screwed spindle 43 connected fixedly to the fence. The transmission 41 is however embodied such that it can drive a vertical output shaft 44. Via a right-angle transmission 45 the shaft 44 drives a horizontal shaft 50 which, again via a right-angle transmission 46 close to the opposite end of the relevant feeding fence, drives a vertical shaft 51, which forms the input shaft of a transmission 47 corresponding to the transmission 41. When the motor 42 is set into operation this transmission 47 thus drives the screwed spindle 48 in the same manner as the screwed spindle 43 is driven. In this way the feeding fence is driven synchronously at both ends in certain manner.

Figure 7:
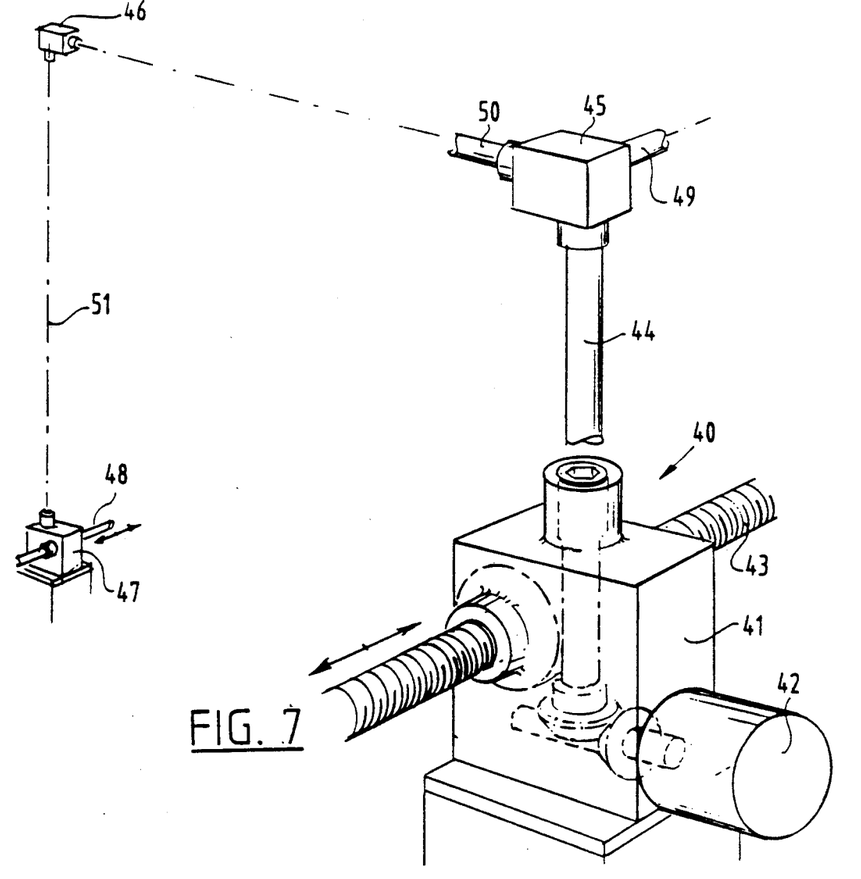
FIG. 7 shows schematically another embodiment of a drive device for the feeding fence according to the invention.

The right-angle transmission 45 is further embodied such that it has a second output shaft 49 which extends to a similar drive device of a similar feeding fence disposed opposite. This drive device can have its own electromotor, wherein the shaft 49 serves to synchronize the two drivings.

The feeding fence device 55 shown in FIG. 8 once again comprises two oppositely disposed feeding fences 56, 57. The drive device 58 in this embodiment comprises a casing connected fixedly to the ground wherein a transmission 60 is housed which is drivably coupled to a reversible electromotor 59. The output shaft of the transmission 60 is formed by a screwed spindle 61 which engages into nut 62, support 63 connected fixedly to the side fence of the feeding fence 57, said output shaft being freely slidable and rotatable in support 63. Through rotation of the screwed spindle 61 using the electromotor 59 the feeding fence 57 can thus be moved reciprocally.

Figure 8:
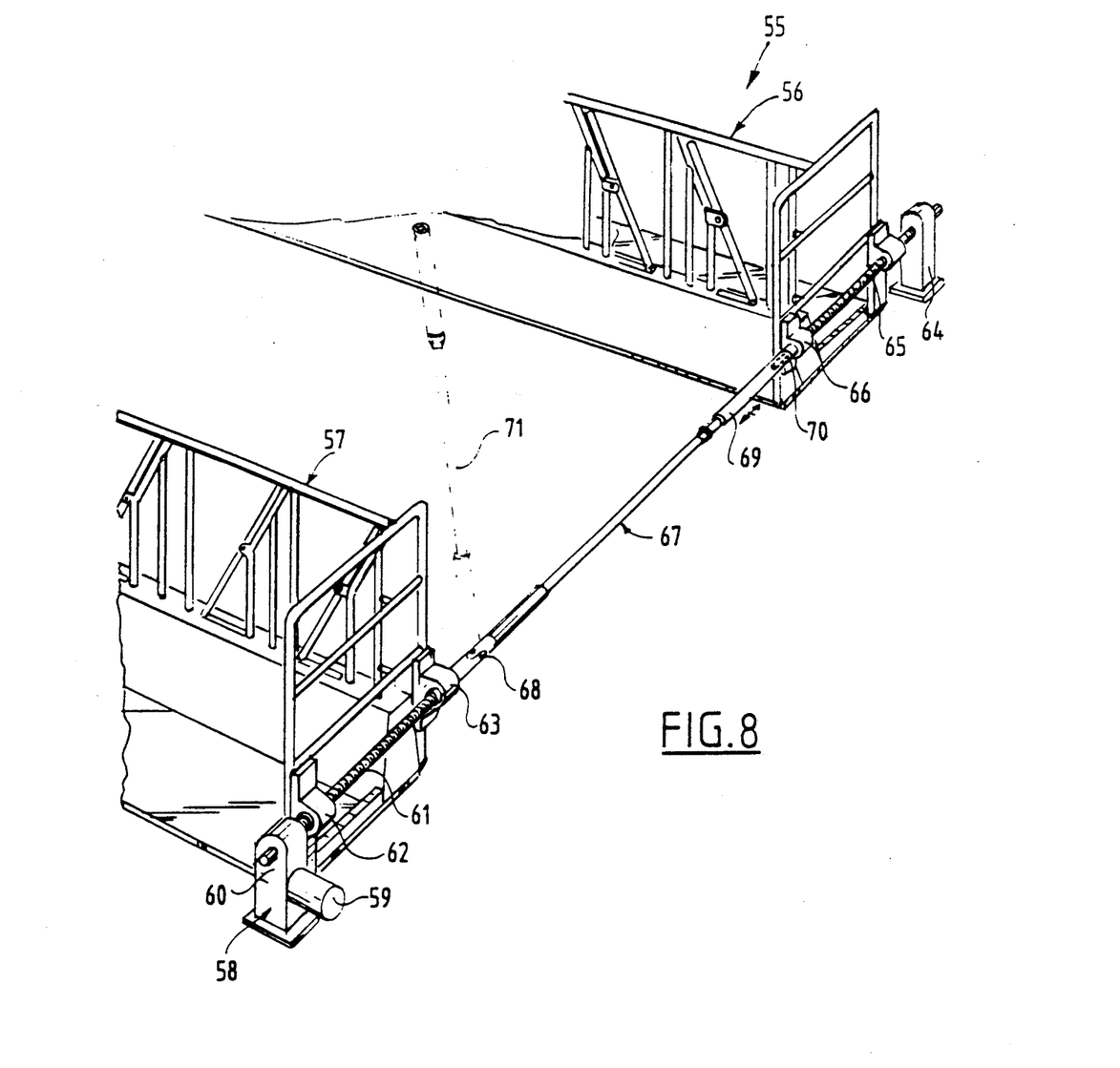
FIG. 8 shows a partly perspective view of yet another embodiment of the device according to the invention.

The feeding fence 56 comprises a similar nut support 66 which cooperates with a screwed spindle 65 which is bearing mounted with its end in a support 64 connected fixedly to the ground. This screwed spindle 65 is driven by the same driving 58 using a coupling rod 67. The coupling rod 67 is coupled at one end to the screwed spindle 61 by means of a universal joint 68 and with its other end to the screwed spindle 65 by means of a releasable coupling. This releasable coupling comprises a slide piece 69 which is arranged slidably but not rotatably on the rod 67 and is provided internally with gripping means which grip onto coupling elements 70 at the end of the screwed spindle 65, said slide piece 69 and said screwed spindle 65 being freely slidable and rotatable in the support 66. In the position of the coupling rod 67 drawn in full lines the two feeding fences 56, 57 are driven synchronously by the one driving 58. By sliding the slide jacket 69 to the left the coupling rod 67 is released from the screwed spindle 65 and can be folded upward to the position designated with 71. The space between the two feeding fences 56, 57 can hereby be made easily accessible for placing fodder between the feeding fences. Due to the placing of the screwed spindles at a level considerably above the ground they remain free of dirt.

Although the partition wall of the feeding portion is drawn in each of the figures, it is not necessary in all cases. The partition does not however form an essential part of the invention.

The embodiments shown relate to the most usual fences disposed opposite one another in twos. A single feeding fence can also be employed, for instance with a driving as shown in FIG. 6.

I claim:

1. Device for feeding animals comprising at least one feeding fence with a frame displaceable over a ground surface, a number of bars attached to the frame which in pairs define openings through which the animals can place their head, and means for displacing the feeding fence over the ground surface, wherein the frame, is supported directly on the ground surface through support means, and is provided with a floor plate extending at a small interval above the ground rearward of the frame to a rear edge making contact with the ground, which plate can support at least the front legs of the animals which have pushed their head through the respective openings, wherein the feeding fence is of the self-catching type, wherein close to each opening there is a swivel bar locking behind the head of the animal after the head has been pushed through the opening, and wherein the displacing means comprise motor drive means which prevents movement of the feeding fence when said motor drive is not operated.

2. Device as claimed in claim 1, wherein the support means comprise a number of wheels mounted rotatably on the frame.

3. Device as claimed in claim 2, wherein the wheels have a diameter of more than 20 cm.

4. Device as claimed in claim 3, wherein the wheels have a diameter of 40 cm.

5. Device as claimed in clam 2, wherein the number of wheels is arranged fixedly on one continuous rotatably mounted lengthwise shaft and wherein the drive means drivably engages the lengthwise shaft.

6. Device as claimed in claim 5, wherein the wheels have a diameter of more than 20 cm.

7. Device as claimed in claim 6, wherein the wheels have a diameter of 40 cm.

8. Device as claimed in claim 1, wherein the support means comprise a number of slide supports fixed to the frame and that the drive means grips on one side onto the frame and on the other side onto a support element connected fixedly to the ground surface.

9. Device as claimed in claim 1, wherein the support means comprise a number of slide supports fixed to the frame and that the drive means grips on one side onto the frame and on the other side onto a frame of a substantially identical feeding fence disposed opposite for simultaneously moving these feeding fences towards and away from one another.

10. Device as claimed in claim 1, wherein the drive device comprises a reversible electromotor.

11. Device as claimed in claim 10, wherein at least one nut is arranged on the frame, that a screwed spindle of the screw drive device extends through the nut and is connected for rotatable driving to a drive gear mounted on the support element, and wherein a corresponding screwed spindle of the oppositely located feeding fence provided with an opposed thread is coupled to said drive gear.

12. Device as claimed in claim 11, wherein the screwed spindles are coupled by a releasable coupling rod.

13. Device as claimed in claim 12, wherein the coupling rod is connected to the one screwed spindle by a universal joint and at its opposite end bears a slidable but not rotatable slide jacket which is provided internally with gripping means which grip onto coupling elements at the end of the oppositely located screwed spindle.

14. Device as claimed in claim 1, wherein the drive device is a screw drive device.

15. Device as claimed in claim 14, wherein at least one nut is arranged on the frame, that a screwed spindle of the screw drive device extends through the nut and is connected for rotatable driving to a drive gear mounted on the support element, and wherein a corresponding screwed spindle of the oppositely located feeding fence provided with an opposed thread is coupled to said drive gear.

16. Device as claimed in claim 1, wherein on either side of the frame a drive device is arranged.

* * * * *